Dec. 2, 1947.   E. L. STEVENS   2,431,779
TRACTOR-TRAILER COUPLING MECHANISM
Filed Nov. 25, 1944    2 Sheets-Sheet 1
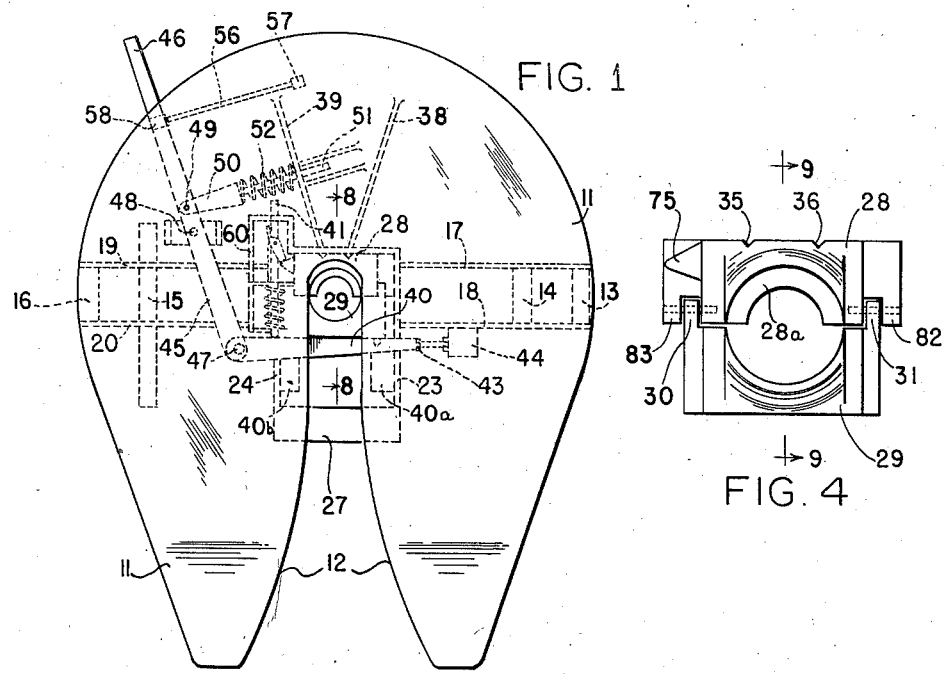
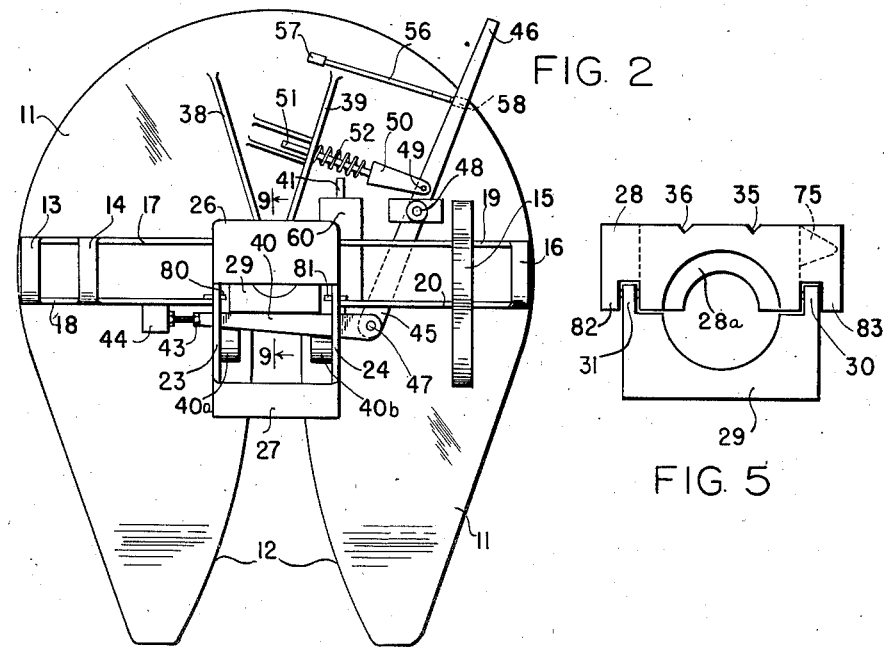
*INVENTOR.*
EVERETT L. STEVENS
BY
George A. Auer
ATTORNEY Dec. 2, 1947. E. L. STEVENS 2,431,779
TRACTOR-TRAILER COUPLING MECHANISM
Filed Nov. 25, 1944 2 Sheets-Sheet 2
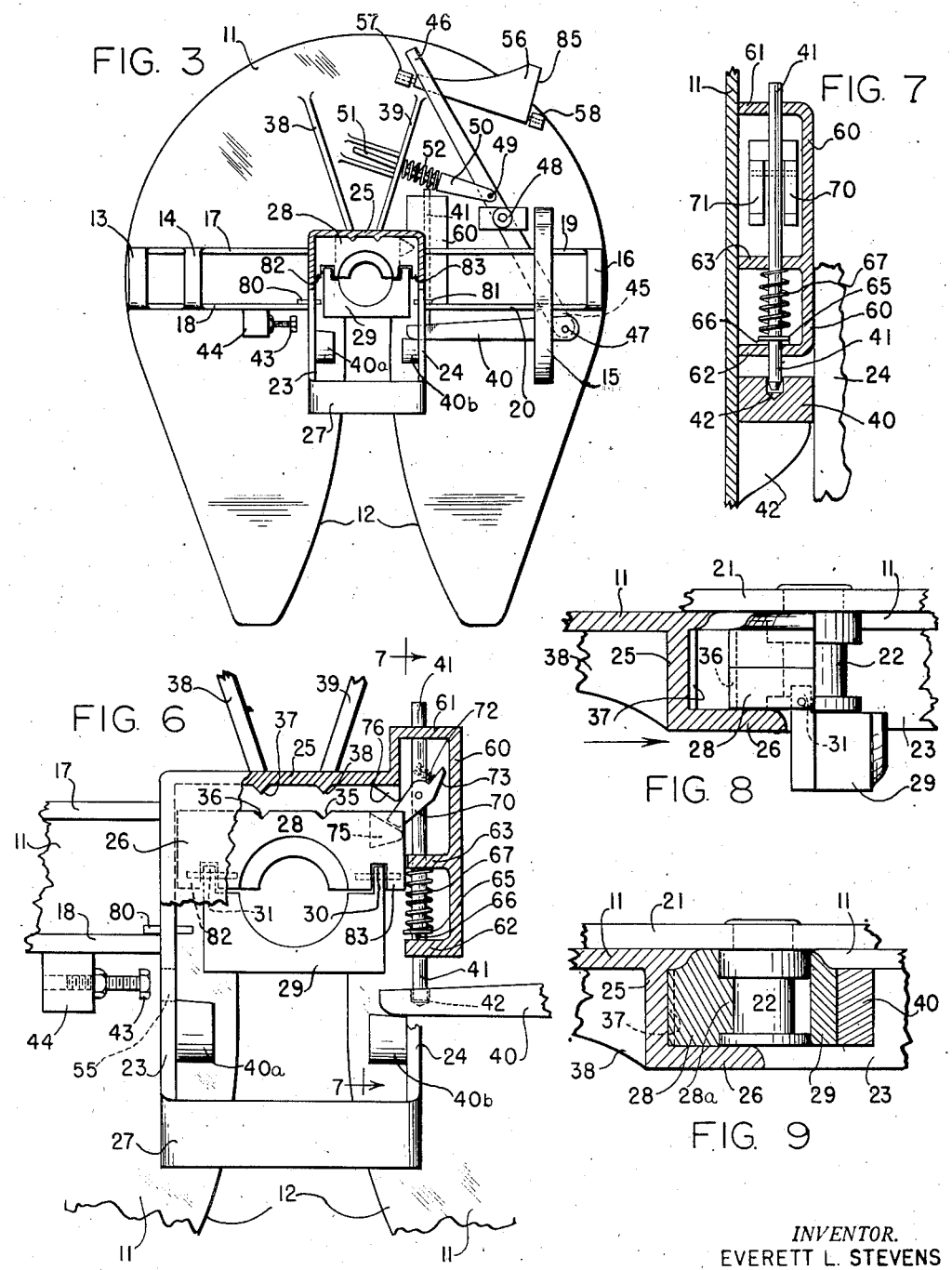
INVENTOR.
EVERETT L. STEVENS
BY
George A. Auer
ATTORNEY Patented Dec. 2, 1947

2,431,779

UNITED STATES PATENT OFFICE 2,431,779

TRACTOR-TRAILER COUPLING MECHANISM

Everett L. Stevens, Oak Park, Ill.

Application November 25, 1944, Serial No. 565,085

15 Claims. (Cl. 280—33.1)

This invention relates to couplings for power trucks and trailers, and is particularly concerned with an improved automatically operating coupling mechanism of the type commonly referred to as a "fifth wheel."

A coupling mechanism such as noted above comprises a generally horizontally disposed plate or platform-like structure which is tiltably mounted in the rear of a power truck. The trailer which is to be coupled to the power truck is provided with a so-called "king-pin" depending from its bottom at the forward end thereof. In storage or during loading and unloading, the forward end of the trailer is supported in elevated position, e. g., by means of a suitable jack. The coupling is initiated by backing the power truck toward the trailer, i. e., by moving it rearwardly for the purpose of slipping the platform of the fifth wheel underneath and in supporting relation to the forward end of the trailer, thereby slipping the king-pin into the fifth wheel mechanism. The coupling is completed by actuating certain locking or retaining means to maintain the king-pin in coupling engagement with the mechanism. In the present case, the coupling and retaining means are operated automatically. The trailer is thus hitched to the power truck and forms an operating transport unit therewith.

The impact, jarring and shearing forces working on the mechanism are of great magnitude and call for very sturdy and, accordingly, relatively massive construction of its elements, including the movable operating parts, i. e., the means forming the coupling, retaining and locking devices therefor.

The requirement for massive construction of parts is somewhat in conflict with the further requirement for instantaneous action during the coupling operation. The problem will be understood when it is considered that the fifth wheel mechanism, incident to the coupling operation, may hit the king-pin of the trailer with a considerable impact force, depending on the skill of the operator of the power truck, followed an instant later by a jarring rebound. The condition requires instantaneous operative response of the automatic coupling and retaining elements at the precise moment when the king-pin is in proper position within and with respect to the coupling mechanism. If the operative actuation of the coupling and retaining means is ever so slightly delayed, the rebound and jarring following the impact may cause momentary dislocation of the king-pin from its proper position and consequent failure of the coupling. The operator, unaware of such failure and believing that the trailer has been properly coupled, may start the power truck in forward direction and thus unwittingly remove the support from the trailer and cause its forward end to fall to the ground.

The mechanism also suffers considerable wear, even with experienced and careful operation, due to the jarring, shearing and twisting forces to which it is subjected under the varying road, traffic and load conditions that might be encountered. Wear on the king-pin and on the coupling and retaining elements may bring about failure and accidental uncoupling on the road.

Such failures, either incident to the coupling operation as such, or on the road, represent hazards known and feared by every operator. They may cause damage to the king-pin, to the trailer body, to the flooring if they occur in a warehouse or garage, and to the goods contained in the trailer; they also cause annoying loss of time and may occasion expensive repairs and bills for damages.

The invention provides a sturdy and simple coupling mechanism of the fifth wheel type, which satisfies the requirement for instantaneous automatic coupling action, security against accidental uncoupling during operation, ease of uncoupling when so desired, and incorporates means in the mechanism for making adjustments to compensate for wear of parts so as to maintain security and efficiency of operation and to lengthen the life of the mechanism.

Some of the salient specific objects and features of the invention are briefly noted below:

The invention provides a novel split bearing for the king-pin, comprising two coacting hingedly connected journal members, and guide means for slidably mounting such members underneath the top plate or platform of the fifth wheel. The journal members and the guide means are so constructed and arranged that one of the journal members is disposed in released position of the mechanism at an angle to the other journal member, hingedly depending therefrom, thus keeping the coupling open for the reception of the king-pin, permitting the king-pin to enter, sliding the journal members within the guide, and thereby causing rotation of the depending journal member upwardly into closed position in which the two journal members encircle the king-pin and form a bearing therefor.

Means are provided for centering the bearing within the guide, and reinforcing ribs connect the rear wall of the guide with the top plate so as to distribute and to dissipate impact forces which may occur incident to the coupling as well as during the operation of the coupled transport unit.

Another feature of the invention is concerned with the provision of a retaining member for the split bearing, which is made in the form of a tapered bar adapted to operate in wedge-like manner against the hingedly mounted journal member to keep the split bearing closed around the king-pin and to lock it firmly in position, while the king-pin may rotate within the bearing in coupling engagement therewith.

A further object of the invention has to do with the provision of means for maintaining the tapered, wedge-like retaining bar in released position out of contact with the bearing so as to permit entry of the king-pin into the mechanism and actuation of the split bearing, as intimated before, and trip means controlled by the bearing and released exactly at the moment when the bearing is in proper position, encircling the king-pin, for the purpose of actuating the retaining bar to lock the coacting journal members forming the bearing firmly in place, thus automatically completing the coupling operation and securing the mechanism against accidental uncoupling.

Still another object is realized by the provision of adjustable means for limiting the displacement of the bearing- and king-pin-retaining bar in such a manner that wear on the parts can be compensated by a simple adjustment for the purpose of maintaining the bearing firmly and securely locked in operating position throughout the life of the mechanism.

These and other objects and features will be brought out in detail in the description which is rendered below with reference to the drawings. In these drawings, Fig. 1 shows a top view of an embodiment of a fifth wheel made in accordance with the invention, with the operating parts of the mechanism shown underneath in dotted lines;

Fig. 2 illustrates a bottom view of the fifth wheel with the normally visible parts in full lines;

Fig. 3 is a view similar to the one shown in Fig. 2, showing the mechanism in released position, with some parts broken away so as to bring out certain details;

Fig. 4 represents an enlarged top view of the split bearing for the king-pin in the same position as it appears in Fig. 1;

Fig. 5 is an enlarged view of the split bearing for the king-pin from the opposite side, in the position as seen in Figs. 2, 3, and 6;

Fig. 6 illustrates the split bearing for the king-pin on an enlarged scale and in position within its guide means, similar to the position in which it is shown in Fig. 3, together with certain operating parts, including the retaining lever for the bearing and the trip means therefor;

Fig. 7 is an edge view of the trip means as seen along the lines 7–7 in Fig. 6;

Fig. 8 shows the split bearing in open released position, with the king-pin just entering (or leaving) the same, and part of the guide means for the split bearing, the guide means being shown in section taken approximately along the lines 8–8 in Fig. 1; and Fig. 9 is a sectional view of part of the guide of the split bearing, with the king-pin in locked retained position, as seen approximately along lines 9–9 in Fig. 2.

Like parts are numbered alike throughout the drawings. Details and elements which may be presumed to be well known will be described only to the extent necessary for supporting the understanding of the invention. The drawings are not to scale. The dimensions of some parts are distorted at the expense of other parts so as to bring out details which would otherwise remain obscure.

Referring now to the drawings, especially to Fig. 1, numeral 11 indicates the platform-like top plate of the fifth wheel as seen from above. This top plate has a radially extending cut-out flaring outwardly, as indicated at 12, thus providing an opening for the reception of the traction member or king-pin which is indicated in Figs. 8 and 9 at 22. The ends of the two wings of the platform or top plate are disposed at an angle to the general plane thereof, i. e., downwardly from the plane of the drawing Fig. 1, and upwardly out of the plane of drawings Figs. 2 and 3, for the purpose of facilitating the placement of the mechanism underneath a trailer.

The coupling mechanism, as previously mentioned, is mounted in the rear of a power truck by means of the bosses 13, 14, 15, 16 connected by channel ribs 17, 18, 19, 20, the bosses 13—14 and 15—16 forming bearings for the reception of suitable bearing pins or bearing shafts. It will be observed that the mounting is off center. The mechanism will therefore be disposed on the power truck in rearwardly downwardly tilted position which also facilitates the slipping of the mechanism underneath a trailer. Part of the bottom of the trailer is indicated in Figs. 8 and 9 by numeral 21, and attached to the trailer bottom, as shown in these figures, is the traction member or king-pin 22. The king-pin is provided with a flange at each end of a reduced central portion. The shape of the king-pin corresponds to the standard shape generally used for such structures.

Depending from the bottom of the platform or plate 11 is a casing or cage-like guide housing comprising the side walls 23–24, extending underneath and generally in parallel with the radial cut-out 12 of the platform, a rear wall 25 particularly shown in Figs. 3, 6, and 8, 9, a bottom plate 26 which extends across in the rear of the guide housing or cage connecting the side walls 23–24, and a bottom connecting member 27 extending across and connecting the side walls 23 and 24 at the forward end thereof. The guide housing or cage, with its members so far described, may be part of the integrally cast structure of the fifth wheel mechanism.

Slidably mounted in the guide housing or cage is the split bearing comprising two journal members indicated by the numerals 28—29. The journal member 29 is hingedly connected with the journal member 28 by arms 30—31 extending therefrom into recesses in the journal member 28. Suitable hinge or pivot pins, as indicated, may be provided for this purpose. These journal members form the bearing for the king-pin, encircling the king-pin in coupled operated position, as shown in Fig. 9. The journal member 28 is provided with a semi-circular projection forming a trunnion 28a for engagement with the central portion of the king-pin.

In released position the split bearing is disposed as shown in Fig. 8, with the journal member 29 depending downwardly from its pivotal mounting on the journal member 28, thus keeping the bearing open for the reception of the king-pin 22. Upon backing up or moving the power truck rearwardly, in the direction of the arrow shown in Fig. 8, the journal member 28 is moved into position in engagement with the king-pin 22, and further rearward movement of the power truck causes the journal member 29 to rotate in counter-clockwise direction from the position shown in Fig. 8. This closing operation of the bearing occurs incident to rearward movement of the journal member 28 within the guide relative to the bottom closure 26 which extends across the side walls 23 and 24. In completely closed position the journal members 28—29 encircle the king-pin 22, as shown in Fig. 9. The rear wall of the journal member 28 is then in engagement with the inside of the downwardly depending rear wall 25 of the guide. The top of the bearing formed by the journal members is flush with the top surface of the platform 11, the curved end of the top of journal 28 fitting into the concave rear end of the radial cut-out 12 of the platform 11.

In order to center the split bearing properly within the guide, I have provided grooves 35 and 36 in the rear wall of the journal member 28 for engagement with wedge-like projections 37 and 38 extending from the rear wall 25 of the guide housing inside thereof. Upon moving the journal member 28 rearwardly relative to the guide housing, as discussed in connection with Figs. 8 and 9, the grooves 35 and 36 engage the projections 37 and 38 in obvious manner, thus properly centering the bearing within the guide.

The impact forces incident to the coupling operation, including the actuation of the split bearing as above described, are of considerable magnitude, and damage may result to the rear wall 25 of the guide housing, which may manifest itself by bulging or other deformation, and under severe operating conditions, even breakage of the guide housing. It must be considered that similar impact forces also operate on the rear wall 25 of the guide housing on the road, for example, due to sudden stopping of the transport unit. The trailer, which may carry up to ten and more tons, then jerks suddenly forward and the kind-pin propagates impact forces to the journal member 28 which in turn propagates such forces to the rear wall 25 of the guide housing. In order to prevent damage to the mechanism under such conditions, I have provided reinforcing ribs 38 and 39 extending rearwardly from the back wall 25 of the guide housing at an angle thereto in continuation of the centering projections 37 and 38 disposed on the back wall 25 inside thereof. Impact forces operating on the back wall 25 will thus be dissipated and distributed, and the danger of damage to the mechanism is greatly lessened, and under normal, predictable operating conditions practically eliminated. The reinforcing ribs 38 and 39 may also be cast integrally with the structure; that is, they may form an integral part of the casting comprising the platform, its mountings and the cage or guide means described above. It is understood, of course, that the mechanism may be made of assembled parts instead of the casting as intimated. The casting is, however, preferred.

The retaining means for the split bearing comprises a tapering, wedge-shaped bar 40 disposed in closed, operated position of the mechanism in front of the journal member 29 of the bearing across the space between the side walls 23 and 24 of the bearing guide housing. The mechanism is shown in this position in Figs. 1 and 2. The split bearing is then in the position Fig. 9, encircling the king-pin. In Figs. 3, 6 and 7, the wedge-shaped retaining bar 40 is shown in retracted position in which it is locked by a pin 41 extending into a recess 42 in the retaining bar 40. The split bearing is then in released position in which it is shown in Fig. 8. Pulling forces are propagated in operated position of the mechanism (Figs. 1, 2 and 9), from the king-pin to the journal member 29 and from this journal member to the bar 40, which is maintained against displacement in the direction of the pulling forces by wedge members 40a—40b disposed underneath the platform 11 adjacent the side walls 23 and 24 of the bearing cage or guide housing. The pulling forces, i. e., steady pull, as in sustained travel, as well as sudden pulls, as in starting or accelerating, are thus distributed and dissipated over a large area of the fifth wheel platform.

The operative forward motion, into retaining position, of the wedge-shaped bar 40 is limited by a stop member 43 which, for the sake of convenience, is shown in the form of a simple screw. This screw is carried in a boss 44 which depends from the bottom of the platform 11, and is thus adjustable within the boss 44. The adjustability of the stop member enables the operator to compensate for wear on the bearing as well as on the retaining bar 40 and parts of the guide means. If checking of the mechanism reveals some wear, the operator will simply release the stop member 43 and rotate it a sufficient number of turns to compensate for the wear. The essential thing to be kept in mind in connection with such adjustment is that the retaining bar 40 should always retain the bearing in closed position, tightly and firmly held within the guide means in the position shown in Fig. 9.

The retaining bar 40 is hingedly connected with one end 45 of an operating lever forming at the opposite end the handle 46, the pivotal connection being indicated at 47. The operating lever in turn is pivotally mounted at 48. Hingedly connected to the operating lever at 49 is a suitable clevis 50 carrying an arm or pin 51 which extends through an opening in the reinforcing rib 39. A spring 52 is interposed between the clevis 50 and reinforcing rib 39 and tends to keep the operating lever 46 in the position shown in Figs. 1 and 2, which is the operated position, with the retaining bar 40 in front of the journal member 29 of the split bearing, keeping the bearing closed around the king-pin as shown in Fig. 9. It may be mentioned at this point that suitable cut-outs are, of course, provided in the various structural members, including the channel members 19 and 20 and the side walls 23 and 24 of the cage or guide housing through which the operating lever and the retaining bar can move. One such cut-out in the side wall 23 of the cage or guide housing is indicated in dotted lines 55 shown in Fig. 6.

The operating lever 46 is maintained in operated position (Figs. 1 and 2), against inadvertent displacement, by a rotatably mounted gravity lock member 56 comprising a plate such as shown in plan view in Fig. 3, provided with pins at either end which are rotatably mounted in the studs 57 and 58 attached to the top plate or platform, underneath, as shown in the drawings. The edge 85 of the plate 56 is disposed in Figs. 1 and 2 in back of the handle 46. Operation of the handle for the purpose of pulling the retaining bar into retracted position (Figs. 3 and 6) therefore requires tilting of the lock plate 56. Inadvertent release of the mechanism is thus prevented. The shape of the lock plate 56 facilitates operation of the handle 46.

It will be observed that in released position (see Fig. 3) the gravity lock member or plate 56 is disposed substantially in parallel with the bottom plane of the top plate or platform, and is held in this position by the handle 46. The mechanism is thus in position for operation subsequent to the actuation of certain trip means by the split bearing responsive to insertion of the king-pin, as previously described. The trip mechanism removes the locking pin 41 (see Figs. 6 and 7) from the recess 42 within the wedge-shaped retaining bar 40, thus permitting the retaining bar to snap across the space between the side walls 23 and 24 of the bearing guide and into the operated position in which it is shown in Figs. 1 and 2. This operation is accomplished instantaneously when the bearing and the king-pin assume their proper coacting coupled positions.

The trip mechanism comprises a housing 60 which may form an integral part of the principal casting structure. The housing 60 has a rear wall 61, a front wall 62 and a partition 63, all as shown in Figs. 6 and 7. The trip pin 41 extends through the rear wall 61, partition 63 and front wall 62, and its forward section, within the space between the partitions 63 and 62, is provided with a suitable washer 65 and a pin 66. Between the washer 65 and the partition 63 is disposed a spring 67 which normally urges the trip pin 41 forward into engagement with the wedge-shaped retaining bar 40.

Rotatably mounted on the rearward section of the trip pin 41, within the space between the rear wall 61 and the partition 63, are two arms or dogs 70 and 71. These arms are urged inwardly of the mechanism, or in clockwise direction, as seen in Fig. 6, by means of a suitable spring 72 which engages extensions 73 or a cross-piece connecting such extensions of both trip members 70 and 71. The trip members or arms thus are normally tilted in clockwise direction and extend in this position through an opening in the connecting wall between the bearing guide and the trip housing 60 in the path of a wedge-shaped projection 75 provided at one side on the journal member 28 and extending laterally therefrom. Stationary wedge-shaped members, such as indicated in Fig. 6 at 76, are provided within the bearing guide, limiting the forward motion of the trip members 70 and 71 and thus defining their normal position within the mechanism.

Stop means, e. g., pins 80 and 81, provided in the side walls 23 and 24 of the guide housing, limit the release motion of the split bearing. The journal member 29 of the bearing is narrower than the journal member 28, and when these members move relative to the guide, e. g., radially outwardly in alignment with the cut-out 12 in the top plate or platform, that is, downwardly as seen, for example, in Fig. 3, the pins 80 and 81 engage the edges of the side walls 82—83 (see also Figs. 4 and 5) of the journal member 28, thus stopping the journal members against further outward movement away from the rear wall 25 of the guide. In the extreme released position with the edges of the sides 82 and 83 of the journal member 28 in engagement with the pins 80 and 81, the journal member 29 will be able to drop by gravity downwardly into the position shown in Fig. 8, but further outward motion of the bearing is inhibited.

If it is desired to remove the split bearing from the mechanism, e. g., for repair or adjustment, the pins 80 and 81 are removed, and the split bearing is slipped out of the guide housing, first into the position shown in Fig. 8 and then into position for removal.

Keeping in mind the above description of details, the operation of the mechanism will be easily understood. It may be summarized as follows:

It is assumed that a trailer has been delivered at its destination and has been uncoupled from the power truck by operation of the lever 46 into the position shown in Fig. 3. The king-pin moves out of the mechanism and places the split bearing into the position within its guide in which it is shown in Fig. 8. The retaining and the trip mechanisms are in the position in which they are shown in Figs. 3 and 6; that is, the operating lever 46 is in retracted position, as shown in Fig. 3, holding the gravity lock member 56 in position in parallel with the bottom plane of the platform 11, so as to prevent interference with the trip operation incident to coupling of another trailer, and the wedge-shaped retaining bar 40 is in retracted position, as shown in Figs. 3 and 6, with the trip pin 41 engaging the recess 42 therein. The fifth wheel mechanism is thus in position to receive the king-pin of another trailer which is to be coupled to the power truck.

The power truck backs up and the two wings of the platform or top plate formed by the cut-out 12 move underneath the bottom 21 (Figs. 8 and 9) of the trailer in the direction of the arrow indicated in Fig. 8. The king-pin of the trailer slips into the radial cut-out of the fifth wheel, moving toward the journal member 28, finally engaging this journal member, as is apparent from Fig. 8. Further rearward movement of the power truck causes displacement of the journal member 28 toward the back wall 25 of the guide housing, and during this displacement, the journal member 29 encounters the forward edge of the bottom 26 of the guide housing. The journal member 29 therefore rotates in counter-clockwise direction, as seen in Fig. 8, until it finally closes around the king-pin 22.

During the rearward motion of the split bearing, the projection or dog 75 provided on the journal member 28 encounters the forward end of the trip members 70 and 71 (Figs. 6 and 7), engages these trip members, exerting rearward pressure upon them. These trip members 70 and 71 rotate in counter-clockwise direction, as seen in Fig. 6, moving along the edges of the wedge members 76 within the guide. The motion is translated into a sliding motion to the trip pin 41; that is, the trip pin gradually retracts from its position shown in Fig. 6, permitting the wedge-shaped retaining bar 40 to follow in a rotating motion in clockwise direction from its position shown in Figs. 3 and 6. This operation is coincident with the motion in counter-clockwise direction of the journal member 29, as seen in Fig. 8, straightening up and gradually closing around the king-pin 22.

At the time when the split bearing approaches its rearmost position within its guide housing, the grooves 35 and 36 in the journal member 28 encounter the projections 37 and 38 in the back wall 25 and center the bearing. At this moment the operation of the coupling is completed; the split bearing encircles the king-pin as shown in Fig. 9; and the trip pin 41 is retracted to released position, suddenly releasing the wedge-shaped retaining member 40 by removal of its forward end from the recess 42 in the retaining bar 40, and the retaining bar snaps in an instantaneous motion across the space between the side walls 23—24, engaging with its forward end the stop 43. The coupling is completed, the split bearing is held tightly and firmly in place with the king-pin encircled by it, retaining the king-pin against accidental removal, but holding it rotatably in place.

The operating lever 46 is displaced in clockwise direction from its position shown in Fig. 3, assuming the position shown in Figs. 1 and 2. The forward end of the lever 46 thus passes the edge 85 of the rotatable locking member 56, and this member rotates on its hinges 57 and 58 downwardly (perpendicularly out of the plane of the drawing, Fig. 3, into the position shown in Figs. 1 and 2), the edge 85 locking behind the lever 46, as shown particularly in Figs. 1 and 2, thus preventing accidental displacement of the lever 46 and consequently preventing accidental release of the mechanism. The power truck is coupled to the trailer and again forms a transport unit therewith.

The above described operations take place very quickly, requiring only an instant subsequent to engagement of the bearing by the king-pin.

When the transport unit arrives at its destination, uncoupling is accomplished simply by lifting the lever lock member 56 from its position shown in Fig. 2 into the position shown in Fig. 3, and moving the lever 46 into retracted position shown in Fig. 3. It is understood that suitable supporting means, for example, a jack, has been provided for the support of the forward end of the trailer preparatory to removing the power truck and its fifth wheel mechanism. The power truck is then moved forward to uncouple the trailer. The pressure thereby exerted by the king-pin on the journal member 29 tends to pull the split bearing out of its guide in the direction of the arrow shown in Fig. 8. When the bearing has assumed the position shown in this figure, the edges 82 and 83 of the journal member 28 (Figs. 4 and 5) engage the stop pins 80 and 81, the journal 29 drops by gravity automatically downwardly into position at an angle to the journal member 28, as shown in Fig. 8, thus releasing the king-pin, and further motion of the power truck in forward direction removes the fifth wheel mechanism from underneath the forward end of the trailer. The mechanism is now again in the position shown in Figs. 3 and 6, with the bearing in the position shown in Fig. 8, and is open for entry of the king-pin of another trailer to be coupled to the power truck.

Wear on certain operating parts may be compensated, as previously described, by adjustment of the stop member 43. The journal pins of the gravity lock plate 56 may also be made adjustable within their bearings 57 and 58 so as to provide for properly locking the operating lever 46 subsequent to adjustment of the stop member 43. The mechanism can thus be maintained in good working order throughout its life.

Changes may be made within the scope and spirit of the following claims which define what is believed to be new and desired to have protected by Letters Patent of the United States.

I claim:

1. In a tractor-trailer coupling mechanism including a so-called fifth wheel mounted in the rear of a power truck for the purpose of coupling thereto a trailer by means of a kingpin which depends from the bottom of the trailer at the forward end thereof, a device in said fifth wheel for receiving and for retaining said kingpin responsive to rearward movement of said power truck toward said trailer so as to couple the trailer to said power truck with the fifth wheel disposed underneath the forward end of the trailer, said device comprising a freely slidably mounted journal member, a coacting pivotally mounted journal member adapted to form with said first-named freely slidable journal member a generally cylindrical bearing cavity for encircling said kingpin, said pivotally mounted coacting journal member being disposed in released position substantially at right angle to the axis of the first-named journal member so as to admit said king-pin into said device responsive to movement of the power truck relative to the trailer, such movement and entry of said kingpin exerting a force on said freely slidable journal member and slidably displacing it, means operatively responsive to such displacement for automatically moving the pivotally mounted journal into closed coacting operative position relative to said freely slidable journal member so as to form said bearing cavity which encircles said kingpin, slidably mounted retaining means, and means actuated by said freely slidable journal member for automatically releasing, said slidable retaining means to lock said journal members in coacting operative position encircling said king-pin.

2. The structure and combination defined in claim 1, wherein said slidably mounted retaining means consists of a slidably mounted locking bar, and adjustable stop means for limiting the operative displacement of said locking bar.

3. The structure and combination defined in claim 1, wherein said slidably mounted retaining means comprises a slidably mounted locking member, and adjustable means for determining the extent of displacement thereof, said last-named adjustable means serving the two-fold purpose of controlling the locking action of said slidable member and of permitting adjustment to compensate for wear thereof.

4. The structure and combination defined in claim 1, together with an operating lever for actuating said slidably mounted retaining means, and a pivotally mounted member forming locking means for said lever in released position thereof.

5. The structure and combination defined in claim 1, together with slidably mounted means for holding said retaining means in released position to permit entry of the king-pin into said device, trip means operable by said freely slidable journal member for automatically releasing said holding means upon completion of entry of said king-pin, and adjustable stop means for securing said retaining means in operated position against inadvertent displacement thereof.

6. In a coupling mechanism of the class described having a freely movable box-like bearing member for receiving a traction element under conditions exerting impact forces thereon, means forming a guide housing for receiving and substantially enclosing said box-like bearing member, said guide housing comprising a rear wall containing a projection coacting with a groove in the rear end of said box-like bearing member so as to center such bearing member along the line of thrust of the traction element, and reinforcing means extending from said projection and adapted to take up and to distribute impact forces caused by the thrust exerted by said traction element.

7. The structure and combination defined in claim 6, together with a retaining device for said box-like bearing member comprising a tapered bar operating in the manner of a wedge against said bearing member at the forward end thereof, and reinforcing holding means for said bar adapted to take up impact forces operating against such bar by pulling forces exerted on said bearing member by said traction element.

8. The structure and combination defined in claim 6, together with a retaining device for said box-like bearing member comprising a tapered bar operating in the manner of a wedge against said bearing member at the forward end thereof, reinforcing holding means for said bar adapted to take up impact forces operating against such bar by pulling forces exerted on said bearing member by said traction element, and adjustable means for limiting the extent of operative displacement of said bar to compensate for wear of said bar and/or parts operatively associated therewith.

9. In a tractor-trailer coupling mechanism having a plate-like base provided with a radially extending radially outwardly flaring cutout, means forming an elongated guide which is disposed underneath a portion of said cutout and extends in parallel therewith, said guide comprising side walls depending from said base, a rear wall joining said side walls transversely at the rear end thereof and a fractional bottom wall extending forwardly from the bottom edge of said rear wall and joining said side walls transversely for a portion thereof to form with said side walls and said rear wall a forwardly open-ended enclosure, a box-like split bearing comprising a first journal member having a generally semi-circular groove and being freely slidably disposed in said enclosure, a second coacting journal member pivotally connected with said first journal member, said coacting journal member having a generally semi-circular groove and being disposed in released position of the mechanism substantially at right angle to said first journal member and depending therefrom in front of the forward edge of said fractional bottom wall to permit inward movement by way of said radially extending cutout in said base, of a bolt or pin-like traction member and entry of such traction member into the mechanism, whereby said first-named journal member is slidably rearwardly displaced within said enclosure by the force exerted thereupon by said inwardly moving traction member in engagement with the semi-circular groove thereof, said second-named pivotally mounted coacting journal member rotating angularly upwardly in a follow-up motion relative to said inwardly moving traction member to form a bearing for the traction member by alignment of its semi-circular groove with the semi-circular groove of the first-named journal member forming therewith a generally cylindrical opening which encircles said traction member forming a bearing therefor, and a slidably mounted retainer bar operatively released by the rearward displacement of said first-named journal member to move transversely across the space between said side walls near the forward end thereof for the purpose of engaging said second-named coacting journal member to hold it in coacting operative engagement with said first-named journal member so as to secure the traction member within the bearing formed by said journal members.

10. The structure and combination defined in claim 9, together with stop means for limiting the forward displacement of said first journal member.

11. The structure and combination defined in claim 9, wherein said retainer bar is wedge-shaped for the purpose of exerting pressure on said coacting journal member.

12. The structure and combination defined in claim 9, wherein said retainer bar is wedge-shaped for the purpose of exerting pressure on said coacting journal member, and adjustable stop means for controlling the operative displacement of said wedge-shaped bar so as to determine the pressure exerted thereby on said coacting journal member and to compensate for wear of said bar and structural elements associated therewith.

13. The structure and combination defined in claim 9, together with a manually operable lever for retracting said retainer bar, and means for securing said lever against inadvertent operative displacement.

14. The structure and combination defined in claim 9, together with a manually operable lever for retracting said retainer bar, and locking means for securing said bar in retracted position to permit removal of said traction member from the mechanism.

15. The structure and combination defined in claim 9, together with a manually operable lever for retracting said retainer bar to permit removal of said traction member from the mechanism, locking means for securing said bar in retracted position, and trip means disposed in said enclosure and actuated by said first-named journal member upon completing the operative actuation thereof by said traction member inserted therein to for releasing said locking means so as to effect the operative release of the retainer bar coincident with completion of the insertion of said traction member.

EVERETT L. STEVENS.

REFERENCES CITED

The following references are of record in the file of this patent:

UNITED STATES PATENTS

| Number | Name | Date |
|---|---|---|
| 1,875,477 | Miller | Sept. 6, 1932 |
| 1,981,233 | Harris | Nov. 20, 1934 |
| 2,077,484 | King | Apr. 20, 1937 |
| 2,317,508 | Zoder | Apr. 27, 1943 |
| 2,348,977 | Ketel | May 16, 1944 |